United States Patent
Volz et al.

[11] Patent Number: 6,102,494
[45] Date of Patent: Aug. 15, 2000

[54] HYDRAULIC ASSEMBLY

[75] Inventors: Peter Volz, Darmstadt; Hans-Dieter Reinartz, Frankfurt am Main; Dieter Dinkel, Eppstein/Ts., all of Germany

[73] Assignee: ITT Manufacturing Enterprises, Inc., Wilmington, Del.

[21] Appl. No.: 08/817,736

[22] PCT Filed: Oct. 11, 1995

[86] PCT No.: PCT/EP95/03998

§ 371 Date: Jul. 29, 1997

§ 102(e) Date: Jul. 29, 1997

[87] PCT Pub. No.: WO96/13416

PCT Pub. Date: May 9, 1996

[30] Foreign Application Priority Data

Oct. 26, 1994 [DE] Germany ............... 44 38 163

[51] Int. Cl.$^7$ ......................................... B60T 8/50
[52] U.S. Cl. .......................... 303/116.4; 303/DIG. 10
[58] Field of Search ............... 303/116.4, 113.1, 303/119.2, 119.3; 137/884; 439/34, 299

[56] References Cited

U.S. PATENT DOCUMENTS

| 4,241,642 | 12/1980 | Peeples . | |
|---|---|---|---|
| 4,828,335 | 5/1989 | Fuller et al. | 303/119.3 |
| 5,466,055 | 11/1995 | Schmitt et al. | 303/116.4 |
| 5,634,695 | 6/1997 | Ohta et al. | 303/10 |

FOREIGN PATENT DOCUMENTS

| 0373551 | 6/1990 | European Pat. Off. . |
|---|---|---|
| 0499670 | 8/1992 | European Pat. Off. . |
| 4013160 | 10/1991 | Germany . |
| 4027455 | 3/1992 | Germany . |
| 91079 92 | 3/1992 | Germany . |
| 4118834 | 12/1992 | Germany . |
| 4133879 | 4/1993 | Germany . |
| 4232205 | 3/1994 | Germany . |
| 4234013 | 4/1994 | Germany . |
| 4239361 | 5/1994 | Germany . |
| 4326580 | 2/1995 | Germany . |

*Primary Examiner*—Matthew C. Graham
*Attorney, Agent, or Firm*—Rader, Fishman & Grauer PLLC

[57] ABSTRACT

The present invention relates to a hydraulic assembly for a hydraulic controlling and/or regulating device, including a plurality of hydraulic, mechanical and/or electrically operable functional elements, such as accumulator elements, valve elements, pressure-generating and drive elements which are arranged on an accommodating member, a plurality of pressure fluid channels which interconnect the functional elements and are adapted to provide a hydraulically operable connection between at least one pressure fluid source and a pressure fluid consumer, and a connection to a controlling device for the actuation of the functional elements. A plurality of hollow chambers associated with the functional elements are connected to a joint ventilation system which permits ventilation and bleeding of the hollow chambers for pressure balance with the atmosphere exclusively by way of a point of ventilation which is connected to at least one pressure compensation channel of the ventilation system.

11 Claims, 2 Drawing Sheets

U.S. Pat. No. 6,102,494

HYDRAULIC ASSEMBLY

BACKGROUND OF THE INVENTION

The present invention relates to a hydraulic assembly for a hydraulic controlling or regulating device, in particular for slip-controlled automotive vehicle brake systems.

German patent application No. 42 34 013 discloses a hydraulic assembly of the type mentioned above. For mounting the hydraulic assembly in automotive vehicles, special provisions are necessary to satisfy the specifications in terms of operability of the system (for example, a salt spray test) and, thus, to satisfy the later daily requirements during operation as regards the insusceptibility to salt and spraywater. Special corrosion protection arrangements and sealing and ventilation arrangements are required to ensure the operability of the assembly which, generally, render the assembly more expensive.

To overcome these conditions, special locations and positions for mounting the hydraulic assembly would be desirable. However, such requirements cannot always be complied with in view of the complex arrangement of the assembly in the entire vehicle compound and the limited mounting space available for integration of the systems in an automotive vehicle. Therefore, all relevant components of the hydraulic assembly are frequently sealed in a sophisticated manner at several locations. Further, the individual hollow chambers of the components are separately ventilated and bled for pressure balance. A large number of bleeding points automatically involves a large number of possible trouble sources which may cause malfunctions. Salt or water is likely to accumulate in the valve chamber, pump space, engine compartment and pressure accumulator chamber and possibly causes flooding of the hollow chambers.

SUMMARY OF THE INVENTION

Therefore, an object of the present invention is to provide a hydraulic assembly which is protected against corrosion and minimizes cost and weight. The assembly should permit ventilation and bleeding irrespective of where the entire assembly is positioned, avoiding the application of fluid and differential pressure to the individual hollow chambers.

According to the present invention, this object is achieved by connecting a plurality of hollow chambers associated with functional elements to one joint ventilation system which permits ventilation and bleeding of the hollow chambers for pressure balance in relation to the atmosphere exclusively by way of a point of ventilation which is connected to at least one pressure compensation channel of the ventilation system.

If the pressure compensation channel which is connected to the hollow chamber of the accumulator element terminates directly into a hollow chamber within a cover unit which accommodates the valve elements, and if another pressure compensation channel associated with the drive element and a pressure generation element terminates into the mentioned hollow chamber, and if the point of ventilation is included in the wall of the cover unit, especially simple provisions in terms of manufacture are achieved for making the two necessary pressure compensation channels in the accommodating member. The point of ventilation can be positioned relatively easily in a cover unit which is mainly made of plastics.

A particularly reliable, light-weight and low-cost solution to the problem at issue is attained if the point of ventilation has a gas-permeable wall portion, which is impermeable to fluids and solid particles, however.

A breathing diaphragm is appropriate for the point of ventilation.

According to an alternative, constructive extension, the point of ventilation includes a non-return valve which seals the hollow chambers against the ingress of moisture.

If required, a hose is appropriately used for the reliable ventilation and bleeding of the hydraulic assembly. The hose is connected to the point of ventilation and can be conducted to a moisture-protected area.

A defined connection of the hollow chamber, remote from the working chamber, may be included in the joint ventilation system to the atmosphere. A pressure compensation channel extends from the hollow chamber of the accumulator element to the hollow chamber of the drive element and further until the point of ventilation in the accommodating member.

As another possibility, the point of ventilation can be positioned on the frontal end of the accommodating member opposite the drive element, and on a cover unit encompassing the valve elements.

Further objectives, features, advantages and possible applications of the present invention can be seen in the following description of two embodiments. All features described and/or illustrated per se, or in any expedient combination, represent the subject matter of the present invention.

DETAILED DESCRIPTION OF THE INVENTION

Figure 1:
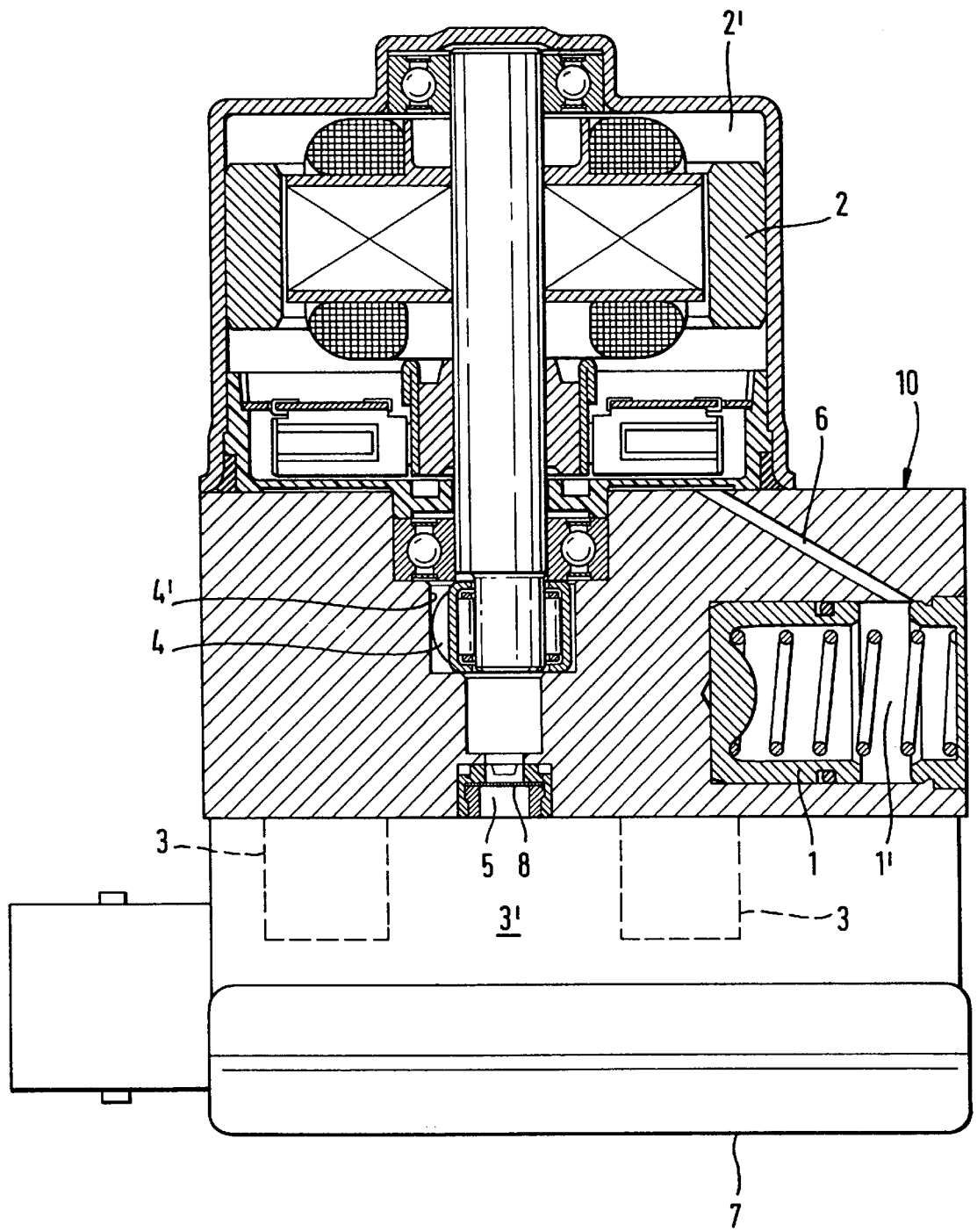
FIG. 1 is a first embodiment of the ventilation system including a point of ventilation arranged between the accommodating member and the cover unit.

FIG. 1 shows a hydraulic assembly including an accommodating member 10, shown in cross-section, for the mounting support of the drive element 2, the valve elements 3 and the accumulator element 1. The drive element 2 comprises a direct-current motor having a rotor mounted on a shaft end in a bowl-shaped housing and having another bearing which is guided in a blind-end bore of the accommodating member 10. This bearing guides the shaft of the drive element 2 in the proximity of the shaft eccentric pin which has a needle bearing for the actuation of a piston-shaped pressure-generating element 4. Another bore portion, reduced in diameter, succeeds the point of support of the drive element 2 in the accommodating member 10. The bore portion is the point of ventilation 5 which extends until the surface of the accommodating member 10. A cover unit 7 which encloses the valve elements 3 in a breathing manner is arranged on the frontal end of the accommodating member 10. The hollow chamber 3' is subdivided for the accommodation of electric or electronic components. The accumulator element 1 is movably aligned in the accommodating member 10 in a transverse position relative to the drive element 2. The hollow chamber 1' interposed between the piston-shaped accumulator element 10 and the associated closure lid is connected to the hollow chamber 2' of the drive element 2 by way of a pressure compensation channel 6. The brush plate of the drive element 2 has corresponding apertures which establish an open connection between the hollow chamber 1' and the hollow chamber 2'. The hollow chamber 2' of the drive element 2 has a pressure-compensating connecting conduit in the direction of the eccentric chamber (hollow chamber 4'), preferably by way of the clearance fit of the brush plate on the drive shaft and the distances between the bearing balls. The point of ventilation 5 is adjacent to the hollow chamber 4'. This provides for an aperture which connects the hollow chambers in the hydraulic assembly to the atmosphere exclusively by way of the point of ventilation 5 existing between the accommodating member 10 and the cover unit 7. Possible pressure variations in the operation of the hydraulic assembly which make the hollow chamber 1' act as an expansion and compression chamber in particular due to the movement of the accumulator element 1, are transmitted exclusively within a closed ventilation circuit. The flows of ventilation generated in the hollow chamber 2' due to rotation are subordinate to the pressure variations of the accumulator element 1. Also, the flows of air which are caused by piston oscillation of the pressure-generating element in the hollow chamber 4' and those caused by rotation of the drive element 2 are of little significance in view of their uniform course. Aeration and bleeding and, thus, the ventilation in the hydraulic assembly, is generally determined by the discontinuous operation of the accumulator element 1. In the embodiment shown, the point of ventilation is preferably a wall portion 8, which is configured as a breathing diaphragm, however, is impermeable to fluids and solid particles. This prevents the ingress of contaminants and fluids into the area of the accommodating member 10, which is sensitive to moisture and dirt, in all operating conditions.

Figure 2:
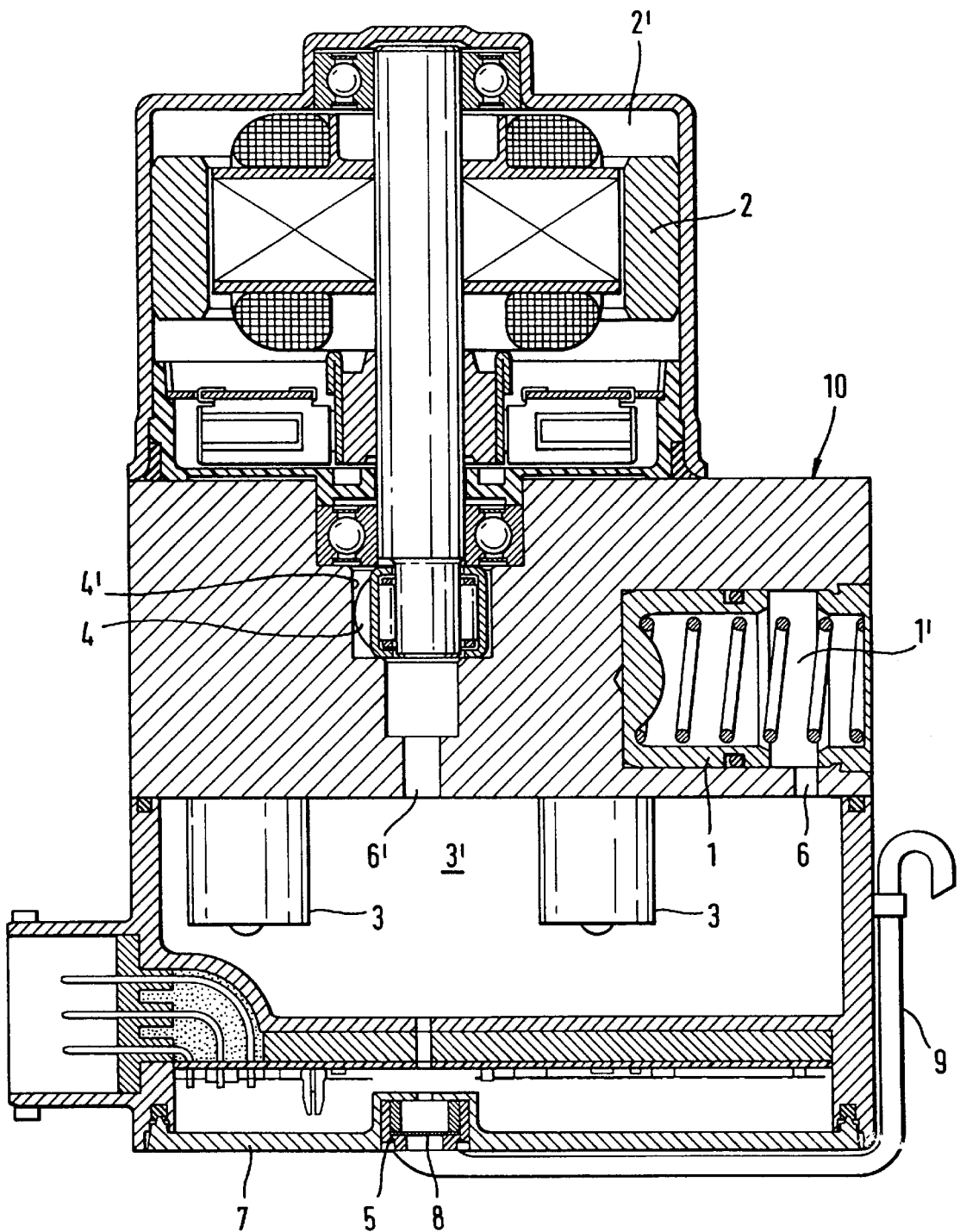
FIG. 2 is an alternative embodiment of FIG. 1, including a point of ventilation, arranged in the cover unit, and an adapted ventilation system.

As an alternative of FIG. 1, however, with an almost identical arrangement and construction of the individual functional elements 1, 2, 3, and 4 on the accommodating member 10, FIG. 2 shows a variation of the ventilation system. In contrast to FIG. 1, a pressure compensation channel 6 from the hollow chamber 1' of the accumulator element 1 in FIG. 2 does not terminate into the hollow chamber 2' of the drive element 2, but directly into the hollow chamber 3' which encompasses the valve elements 3 within the cover unit 7. Advantageously, this results in a direct transmission of possible pressure pulsations of the accumulator element 1 into the relatively large hollow chamber 3' and to the atmosphere through the point of ventilation 5 provided in the cover unit 7. Another pressure compensation channel 6' in the accommodating member 10 establishes a breathing connection to the hollow chamber 4' (eccentric chamber) and to the hollow chamber 2' of the drive element 2. Both pressure compensation channels 6, 6' consequently terminate irrespective of one another into the hollow chamber 3' which is confined by a housing that is in sealing abutment on the accommodating member 10 in the embodiment shown. The cover unit 7 is not provided as an integral component of the housing in the drawing. However, the cover unit 7 primarily has a protective function for all electric or electronic elements incorporated in the hollow chamber 3'. In the embodiment shown, the point of ventilation 5 accommodates a breathing diaphragm which is the gas-permeable wall portion 8 that is impermeable to fluids and solid particles. Succeeding the diaphragm is a hose 9 (shown as an example) which ensures ventilation and bleeding of the hydraulic assembly, protected against fluids and contaminants, irrespective of the positioning of the hydraulic assembly vertically to the shaft, as shown in the drawing. The result is also one single outwardly disposed point of ventilation on the hydraulic assembly so that all functional elements on the accommodating member 10 are sealed. The description of the embodiment of FIG. 1 is referred to inasfar as not all of the details of the embodiment of the hydraulic assembly shown in FIG. 2 have been described.

Thus, the advantages of the present invention involve the simplification of the previously employed individual sealing and ventilating provisions. Accordingly, only one point of ventilation instead of several ventilation points is necessary. Also, complicated sealing measures, for example, by means of O-rings, are eliminated, when the respective parts permit being joined in a metallically seal-tight engagement. In addition, the number of components is reduced, testability of the assembly is facilitated and its reliability in operation is enhanced. Still further, the hydraulic assembly is rendered immersion-proof, and ventilation of the accumulator element is improved in particular, with the result that invariably minimal hydraulic pressures are ensured after completion of the pressure-reduction period when the hydraulic assembly is used on electronically controlled brake systems for automotive vehicles.

What is claimed is:

1. A hydraulic assembly for a hydraulic controlling device, including functional elements comprising accumulator elements and valve elements which are arranged on an accommodating member, a plurality of pressure fluid channels which interconnect the functional elements and are adapted to provide a hydraulically operable connection between at least one pressure fluid source and a pressure fluid consumer, and a connection to a controlling device for the actuation of the functional elements, wherein a plurality of hollow chambers associated with the functional elements are connected to a joint ventilation system which permits ventilation and bleeding of the hollow chambers for the pressure balance with the atmosphere exclusively by way of a point of ventilation which is connected to at least one pressure compensation channel of the ventilation system, and in that the end surface of the accommodating member is confined by a cover unit, and the point of ventilation is positioned between the end surfaces of the accommodating member and the cover unit.

2. The hydraulic assembly as claimed in claim 1, wherein the point of ventilation has a gas-permeable wall portion which is, however, impermeable to fluid and solid particles.

3. The hydraulic assembly as claimed in claim 2, wherein the point of ventilation accommodates a breathing diaphragm.

4. The hydraulic assembly as claimed in claim 1, wherein the point of ventilation has a non-return valve which seals the hollow chambers against moisture.

5. The hydraulic assembly as claimed in claim 1, wherein the hollow chamber remote from a working chamber of the accumulator element is connected to the hollow chamber of the drive element by way of a pressure compensation channel in the accommodating member, the hollow chamber extending up to the point of ventilation in the area of the end surface of the accommodating member.

6. A hydraulic assembly for a hydraulic controlling device, including functional elements comprising accumulator elements and valve elements which are arranged on an accommodating member, a plurality of pressure fluid channels which interconnect the functional elements and are adapted to provide a hydraulically operable connection between at least one pressure fluid source and a pressure fluid consumer, a connection to a controlling device for the actuation of the functional elements and a cover unit, the point of ventilation being provided in the wall of the cover unit, wherein a pressure compensation channel which is connected to a hollow chamber of the accumulator element terminates directly into a hollow chamber which accommodates the valve elements and is arranged within the cover unit, and another pressure compensation channel associated with the drive element and the pressure-generating element terminates into the pressure compensation channel.

7. The hydraulic assembly as claimed in claim 6, wherein the point of ventilation has a gas-permeable wall portion which is, however, impermeable to fluid and solid particles.

8. The hydraulic assembly as claimed in claim 7, wherein the point of ventilation accommodates a breathing diaphragm.

9. The hydraulic assembly as claimed in claim 6, wherein the point of ventilation has a non-return valve which seals the hollow chambers against moisture.

10. The hydraulic assembly as claimed in claim 6, wherein a hose is connected to the point of ventilation.

11. The hydraulic assembly as claimed in claim 6, wherein the hollow chamber remote from a working chamber of the accumulator element is connected to the hollow chamber of the drive element by way of a pressure compensation channel in the accommodating member, the hollow chamber extending up to the point of ventilation in the area of the end surface of the accommodating member.

* * * * *